US008693071B2

(12) United States Patent
Ito et al.

(10) Patent No.: US 8,693,071 B2
(45) Date of Patent: Apr. 8, 2014

(54) IMAGE PROCESSING APPARATUS, IMAGE PROCESSING SYSTEM, AND READABLE COMPUTER MEDIUM

(75) Inventors: Kensuke Ito, Kanagawa (JP); Tetsuya Kimura, Kanagawa (JP); Junichi Matsunoshita, Kanagawa (JP); Sei Amagai, Kanagawa (JP); Masashi Okano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 480 days.

(21) Appl. No.: 13/024,012

(22) Filed: Feb. 9, 2011

(65) Prior Publication Data

US 2012/0033269 A1 Feb. 9, 2012

(30) Foreign Application Priority Data

Aug. 5, 2010 (JP) ................................. 2010-176457

(51) Int. Cl.
*H04N 1/40* (2006.01)
*H04N 1/04* (2006.01)

(52) U.S. Cl.
USPC ........... 358/498; 358/448; 358/474; 358/488; 358/496; 358/497

(58) Field of Classification Search
None
See application file for complete search history.

(56) References Cited

U.S. PATENT DOCUMENTS

2009/0073517 A1* 3/2009 Kuroda .......................... 358/505
2010/0157380 A1* 6/2010 Miyagawa .................... 358/448

FOREIGN PATENT DOCUMENTS

| JP | 09-238250 A | 9/1997 |
| JP | 2002-271576 A | 9/2002 |
| JP | 2004-102562 A | 4/2004 |
| JP | 2005-038389 A | 2/2005 |

* cited by examiner

*Primary Examiner* — Benny Q Tieu
*Assistant Examiner* — Haris Sabah
(74) *Attorney, Agent, or Firm* — Sughrue Mion, PLLC

(57) ABSTRACT

An image processing apparatus includes an acceptance unit that accepts an image of an original from an image reader having a conveying unit that conveys an original in sequence along a conveying path passing through a read position and an image read unit that reads the image of the original at the read position at read speed responsive to conveying speed of the original; an acquisition unit that acquires information concerning a stable read range in which the read speed in the conveying direction in the original becomes a stable state from storage in which the information is previously stored; and a registration unit that extracts feature information concerning a microscopic pattern that a surface of the original has from a registration area in the image of the original accepted by the acceptance unit and registers the feature information in association with position information concerning a position of the registration area.

6 Claims, 6 Drawing Sheets

IMAGE PROCESSING APPARATUS, IMAGE PROCESSING SYSTEM, AND READABLE COMPUTER MEDIUM

CROSS-REFERENCE TO RELATED APPLICATION

This application is based on and claims priority under 35 USC 119 from Japanese Patent Application No. 2010-176457 filed on Aug. 5, 2010.

BACKGROUND

Technical Field

This invention relates to an image processing apparatus, an image processing system, and a readable computer medium.

SUMMARY

According to an aspect of the invention, an image processing apparatus includes an acceptance unit that accepts an image of an original from an image reader having a conveying unit that conveys an original in sequence along a conveying path passing through a read position and an image read unit that reads the image of the original at the read position at read speed responsive to conveying speed of the original by the conveying unit;

an acquisition unit that acquires information concerning a stable read range in which the read speed in the conveying direction in the original becomes a stable state from storage in which the information is previously stored;

a registration unit that extracts feature information concerning a microscopic pattern that a surface of the original has from a registration area in the image of the original accepted by the acceptance unit and registers the feature information in association with position information concerning a position of the registration area; and a determination unit that determines whether or not the feature information is registered by the registration unit based on whether or not the position corresponding to the position information is within the stable read range corresponding to the information acquired by the acquisition unit.

BRIEF DESCRIPTION OF THE DRAWINGS

Exemplary embodiments of the invention will be described in detail based on the following figures, wherein.

DETAILED DESCRIPTION

Exemplary embodiments of the invention will be discussed below based on the accompanying drawings:

[Exemplary Embodiment 1]

Figure 1:
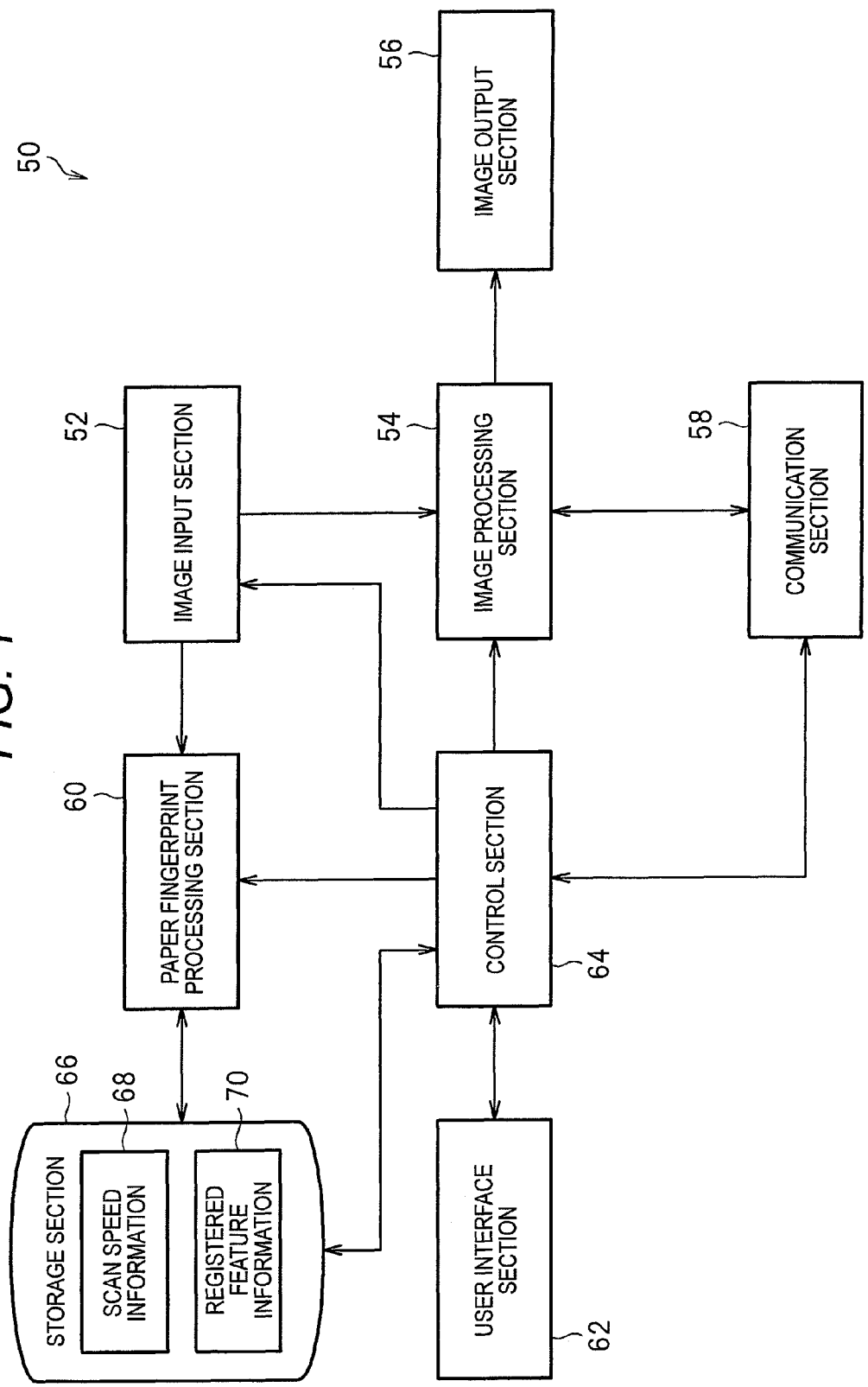
FIG. 1 is a schematic function block diagram of an image processing apparatus according to a first exemplary embodiment of the invention.

An image processing apparatus 50 of Exemplary embodiment 1 is a multiple function apparatus having a copy function, a printer function, an image scanner function, a facsimile function, for example. Further, the image processing apparatus 50 has a registration function and a collation function of a paper fingerprint. The paper fingerprint is a microscopic pattern existing on a surface of an original as a paper medium. The term "microscopic" refers to a state in which a phenomenon is minute as it may not be identified by a sense of a human being. The microscopic pattern is a minute pattern that basically may not be recognized by the naked eye unlike display as a general character or pattern drawn on a surface of a document, for example. Media of some types have a microscopic pattern naturally formed on a surface originally. For example, paper used as an original in the exemplary embodiment is produced as fine fibers with wool pulse as a raw material are intertwined, and random intertwinement of natural fibers produces a paper fingerprint of a microscopic pattern. FIG. 1 is a schematic function block diagram of the image processing apparatus 50. The image processing apparatus 50 includes an image input section 52, an image processing section 54, an image output section 56, a communication section 58, a paper fingerprint processing section 60, a user interface section 62, a control section 64, and a storage section 66.

The image input section 52 has a function of an image reader for reading an image from an original and generating image data. The image input section 52 reads the original image by the function of copy, an image scanner, or facsimile transmission, for example, and obtained image data is input to the image processing section 54. The paper fingerprint processing section 60 also uses the image data for a registration and collation function of a paper fingerprint. The image input section 52 has image read means made up of an image sensor, a light source, a lens, a reflecting mirror, etc., and original conveying means of an ADF of an original move method.

The image processing section 54 performs various types of image processing, rasterizing processing to a bit map format, etc., for the image data, input from the image input section 52. The image processing section 54 outputs the post-processed image data to the image output section 56 or the communication section 58. In a facsimile reception function, the image processing section 54 processes image data input from the communication section 58 and outputs the image data to the image output section 56, for example. The image processing section 54 is implemented as a processing unit of a microprocessor, etc., for example.

The image output section 56 prints an image on a sheet of paper based on the image data input from the image processing section 54. The image output section 56 is made up of an exposure section, a photoconductive body, a developing device, a transfer device, and a fixing unit.

The communication section 58 is connected to a transmission medium of a network, etc., and performs communication processing with any other device connected to the transmission medium. For example, the communication section 58 transmits the image data processed in the image processing section 54 to a different device and receives image data from a different device and inputs the image data to the image processing section 54. When registration feature information of a paper fingerprint is transmitted to and received from a different device, the communication section 58 is also used. The communication section 58 is implemented as a processor, etc.

The paper fingerprint processing section 60 performs processing of registering a paper fingerprint based on an image in a specified area in an original and processing of collating with an already registered paper fingerprint. The paper fingerprint processing section 60 is implemented as a processing unit of a microprocessor, etc., for example, and the function is realized by executing a program. The processing performed by the paper fingerprint processing section 60 is described later.

The user interface section 62 is made up of a touch panel display, buttons, etc. The user may give an operation command, etc., to the control section 64 by operating the user interface section 62. In addition to a command screen, a set screen concerning various functions from the control section 64, the operation state of the image processing apparatus 50, various messages, and the like are displayed on the touch panel display.

The control section 64 is implemented as a processing unit of a microprocessor, etc., and directly or indirectly controls the operation of each section of the image processing apparatus 50.

The storage section 66 is implemented as storage of semiconductor memory, a hard disk drive, etc., and stores a program for realizing processing of each section using a processor, various parameters set by the user, scan speed information 68, registered feature information 70, etc. The scan speed information 68 and the registered feature information 70 are described later.

Figure 2:
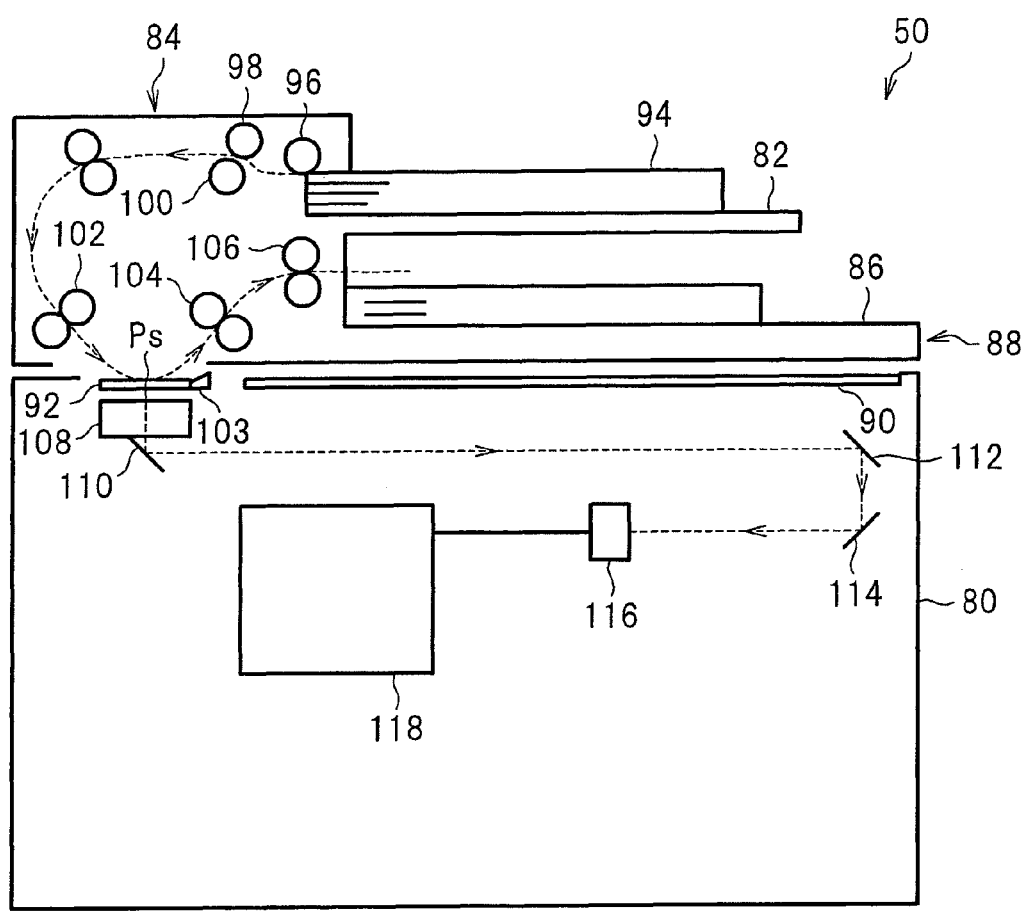
FIG. 2 is a schematic front view of the image processing apparatus according to the first exemplary embodiment of the invention.

FIG. 2 is a schematic front view of the image processing apparatus 50 and shows the schematic structure of ADF of original move method. An original base 88 including a sheet feed tray 82, an ADF 84, and a sheet discharge tray 86 is placed on a main body section 80 of the image processing apparatus 50. The original base 88 is attached to the main body section 80 so that it may be opened and closed in an up and down direction with the back end of the drawing as a hinge part. Manual platen glass 90 in an original fix method on which the user places an original to be read one sheet at a time and ADF platen glass 92 used to automatically convey a plurality of originals in sequence and read them are provided on a top face of the main body section 80. The ADF platen glass 92 is placed below the ADF 84.

A plurality of originals 94 are set on the sheet feed tray 82 with a read face upward. The ADF 84 takes in the originals one sheet at a time from the sheet feed tray 82 by rollers 96, 98, and 100 in the proximity of an entrance of the ADF and conveys the originals along a conveying path bent roughly like letter U. The taken-in original is abut against a pair of rollers 102 of a registration section of a conveying member before read and the direction is adjusted. The pair of rollers 102 sandwiches the original and sends the original toward the ADF platen glass 92. The original slides on the ADF platen glass 92 and passes through a scan position Ps (read position). Accordingly, scan of the original relative to the conveying direction (subscan) is performed. The proceeding direction of the original changes to rollers 104 of a discharge section of a conveying member after read by a guide 103 placed in a back margin of the ADF platen glass 92. The rollers 104 sandwich and pull the original passing through the scan position Ps. The original is discharged onto the sheet discharge tray 86 by rollers 104 and 106. A scanner 108 moving below the manual platen glass 90 at the document read time in the original fix method, namely, optical system scan method stops below the ADF platen glass 92 at the read time in the original move method and exposes the original passing through the scan position Ps on the ADF platen glass 92. A mirror 110 provided for the scanner 108 and mirrors 112 and 114 introduce an original image at the scan position Ps into an image sensor 116 and an image signal of the original output from the image sensor 116 is input to a processing section 118. The processing section 118 includes a microprocessor and, for example, functions as the image processing section 54, the communication section 58, the paper fingerprint processing section 60, and the control section, and storage corresponding to the storage section 66 is provided in the processing section 118.

Figure 3:
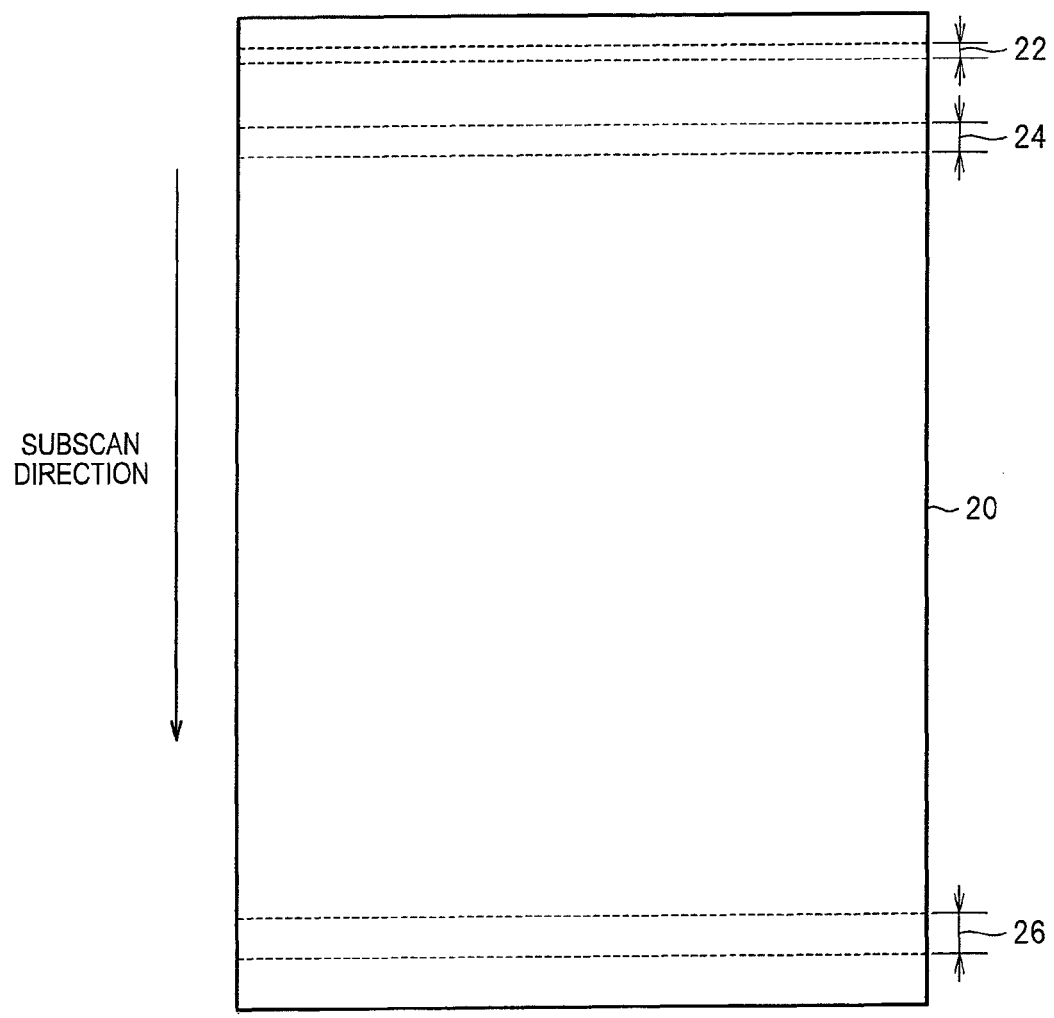
FIG. 3 is schematic drawing to describe occurrence of scan unevenness in an original image scanned using ADF of an original move method.

The ADF 84 described above is used, whereby the original in registration processing and collation processing of a paper fingerprint of the original described later may be read efficiently. In the ADF, unevenness (scan unevenness) may occur in scan speed in the subscan direction. The "scan speed" is speed when each position concerning the subscan speed in the original passes through the scan position Ps and is read speed of reading an image from the original. FIG. 3 is schematic drawing to describe occurrence of scan unevenness in the subscan direction in the original image read in the ADF 84 in FIG. 2. In an image 20, the horizontal direction is a main scan direction and subscan is performed from the top to the bottom. That is, an upper end of the image 20 corresponds to a leading end of the original at the conveying time and a lower end corresponds to a trailing end of the original. The read speed of the image in the subscanning direction is not necessarily uniform; for example, FIG. 3 shows that scan unevenness areas 22, 24, and 26 occur. The scan unevenness area 22 may be caused to occur by a change in the passage speed of the original on the scan position Ps from a stable run state, caused by a shock or resistance as the leading end of the original abuts a slope of the guide 103. The later occurring scan unevenness area 24 corresponds to the scan position in the time period just after the leading end of the original is sandwiched between the rollers 104. The scan unevenness area 26 in the proximity of the lower end of the image 20 corresponds to the scan position in the time period close to passing of the trailing end of the original through the roller 102. The scan unevenness areas 24 and 26 may be caused to occur by occurrence of fluctuation in a force applied to the original at the switching time between a state in which the original is sandwiched between both the rollers 102 and 104 and a state in which the original is sandwiched between the rollers 102 or 104.

Such scan unevenness may have a large effect on an image of a microscopic pattern like a paper fingerprint. This point will be discussed more specifically. If a usual image (character, pattern) expands or contracts about 10%, a large effect does not exist if the expansion or contraction is local. For example, in an image of a test chart a ladder pattern at pitch intervals of 1.1 mm, 10% fluctuation of the pitch interval generally is inconspicuous for a human being. In contrast, a paper fingerprint is a microscopic pattern and is grasped using a limited number of pixels from the viewpoint of lightening the processing burden and thus a large difference may occur in image information because of slight expansion or contraction. For example, an extraction area of a paper finger print is set to 32×32 pixels. This area is a minute area measuring about 1.4 mm per side with read resolution 600 dpi and the whole may be contained in the scan unevenness area. When the paper fingerprint is read, if the scan speed changes 10%, an image expanded or contracted as much as 3.2 pixels from the paper fingerprint image to be essentially extracted is obtained. In this state, a threshold value wherein both FAR (False Acceptance Rate) and FRR (False Rejection Rate) becomes zero does not exist. Specifically, the range in which FRR becomes zero narrows, even real thing is determined to be a fake, and the collation accuracy is degraded. Further, if inverse expansion or contraction occurs in the subscan direction at the registration time and the collation time, the difference becomes 6.4 pixels (20%) and paper fingerprint collation does not function at all.

As for this point, the image processing apparatus 50 stores information concerning the scan speed in an original by the ADF 84 (scan speed information 68) in the storage section 66. The scan speed information 68 is previously stored in the storage section 66 when the registration and collation function of a paper fingerprint is used. Specifically, as the scan speed information 68, information indicating a stable scan range in which the scan speed in the subscan direction in an original in the image processing apparatus 50 becomes a stable state is stored in the storage section 66. To make a distortion correction in the collation function described later, as the scan speed information 68, a characteristic concerning how the scan speed changes in the subscan direction in the original (change characteristic) containing information of the scan speed in any other range in addition to the stable scan range is stored in the storage section 66 in place of or together with information of the stable scan range.

The stable scan range is the position range (stable read range) concerning the subscan direction in the original wherein the scan speed falls within a predetermined fluctuation width. For example, when an area where a paper fingerprint is extracted and registered (registration area) is 32×32 pixels, it is desirable that pixel deviation between the image at the registration time and the image at the collation time when the same paper fingerprint is read should be smaller than one pixel at an arbitrary point in the paper fingerprint. Deviation of on pixel corresponds to a scan speed difference of about 3% (=(one pixel/32 pixels)×100%) between the registration time and the collation time. This means that simply if fluctuation of the scan speed at the registration time and the collation time is equal to or less than ±1.5% relative to one reference speed, it is allowable. Then, for example, the stable scan range may be defined as the range in the subscan direction in which the scan speed fluctuates ±1.5% or less relative to the reference speed. Likewise, if the registration area of a fingerprint is 64×64 pixels, a fluctuation margin of the scan speed between the registration time and the collation time becomes about 1.6% and a condition of the stable scan range at the registration time may be defined as a fluctuation width of ±0.8% or less.

The fluctuation margin of the scan speed between the registration time and the collation time described above is not uniformly distributed to the registration time and the collation time; for example, if the area is 32×32 pixels, the condition of the stable scan range at the registration time may be defined as ±1% or less. In this case, accordingly, the fluctuation margin at the collation time may be made larger than that at the registration time.

The change characteristic of the scan speed is a characteristic representing a change in the scan speed relative to the position of an original in the subscan direction and is represented as a function or a correspondence table, for example. To store the change characteristic of the scan table in the storage section 66 in place of the stable scan range, the stable scan range may be found from the change characteristic as required.

The stable scan range may be found as the structure of the ADF 84, for example. Specifically, the scan unevenness areas 22, 24, and 26 shown in FIG. 3 occur at a position (scan position) in an original where the leading end of the original passes through the scan position Ps in a state in which it abuts the slope of the guide 103 adjacent to the ADF platen glass 92, a scan position in the time period just after the leading end of the original is sandwiched between the rollers 104, and a scan position in the time period in the proximity when the trailing end of the original passes through the roller 102. The stable scan range is set in a portion except the area 22, 24, or 26. For example, an area between the areas 22 and 24 and an area between the areas 24 and 26 are stored in the storage section 66 as the stable scan range. The position of the area 24 measured from the leading end of the original corresponds to the conveying path length from the scan position Ps to the roller 104 and the position of the area 26 measured from the trailing end of the original corresponds to the conveying path length from the roller 102 to the scan position Ps. They are previously obtained from design information of the ADF 84. The sizes of the areas 24 and 26 (lengths in the subscan direction) are also known from the design or empirically. For example, usually a length of about 10 mm is required until run becomes stable after the leading end of the original is sandwiched between the rollers 104, and the area 24 has the size responsive to this. Therefore, the stable scan range between the areas 24 and 26 may be previously found from the information and may be stored in the storage section 66. The stable scan range between the areas 22 and 24 may also be found from the design information of the ADF 84 in a similar manner.

The change characteristics of the stable scan range and the scan speed may be found by actually reading a test chart where a predetermined pattern is arranged in the subscan direction such as a ladder pattern by the original move method in the image processing apparatus 50 and comparing the pattern arrangement in the image data with the former arrangement. In the method, the change characteristics of the stable scan range and the scan speed may be found at any time and the scan speed information 68 in the storage section 66 may be updated.

Acquisition of the scan speed information 68 using a ladder pattern with lines arranged at pitch λ in the subscan direction, for example, will be discussed. Letting the position of the first line from the scan direction on a test chart be α, position x (k) of the kth (k is a natural number) line in the subscan direction on the test chart is represented as x (k)=(k−1)λ+α. On the other hand, the position of the kth line in the subscan direction on a scan image of the test chart is represented as p (k). Scan speed v (k) at the position of the kth line may be calculated from expression v (k)={p (k+1)−p (k−1)}/2λ or v (k)={p (k+1)−p (k)}/λ, for example. The scan speed information 68 may be held in the storage section 66 in the format of a function or a table representing the correspondence relationship between p (k) and x (k), for example, or a calculation value or a function of v (k) may be stored as the scan speed information 68. As for stable scan range, for example, an average value or a mode of V (k) in the whole test chart is found as reference speed and further a range in which deviation of v (k) from the reference speed becomes equal to or less than a predetermined range is found and a pair of the start point and the end point of the range may be stored in the storage section 66 as the stable scan range.

Figure 4:
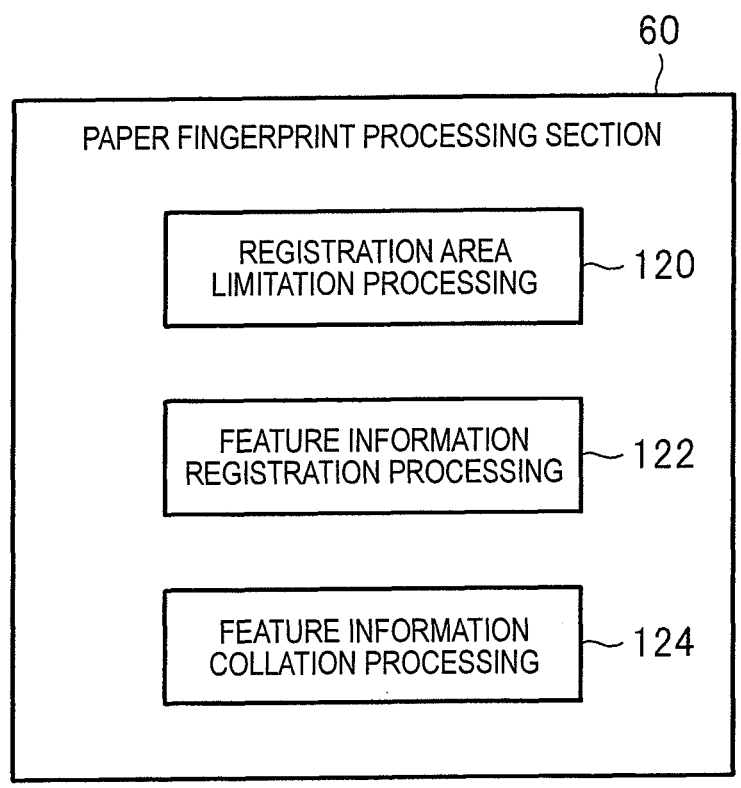
FIG. 4 is a block diagram to show the function of a paper fingerprint processing function of the image processing apparatus according to the first exemplary embodiment of the invention.

The paper fingerprint processing section 60 performs processing using the previously found scan speed information 68 as described above. FIG. 4 is a block diagram to show the function of the paper fingerprint processing section 60. The paper fingerprint processing section 60 has the functions as acceptance means for accepting an image of an original from the image input section 52, acquisition means for acquiring the scan speed information 68 from the storage section 66, registration means for extracting feature information concerning a paper fingerprint from a registration area in an image of an original and registering the feature information in the storage section 66 in association with position information concerning the position of the registration area, determination means for determining whether or not the feature information may be registered based on whether or not the position of the registration area is within the stable scan range, acquisition means for acquiring the registered feature information 70 from the storage section 66, and collation means for setting a collation area responsive to the registration area of the acquired registered feature information 70 in the original to be collated, extracting feature information concerning the paper finger print from the collation area, and comparing the feature information with the feature information in the registration area, and performs registration area limitation processing 120, feature information registration processing 122, and feature information collation processing 124. The paper fingerprint processing section 60 is implemented as a processing unit of a microprocessor, etc., for example, as described above and each means and each processing are realized by executing a program.

In the registration area limitation processing 120, information of the stable scan range is acquired based on the scan speed information 68 stored in the storage section 66 and the range in which the registration area of the paper fingerprint may be set is limited within the stable scan range. One or more registration areas are set in an area where the ground of paper is exposed and neither print nor entry is made. For example, in a configuration wherein candidate areas that may be set as registration areas are preset in a plurality of predetermined places of the whole original and one or more of the candidate areas are selected as registration areas, only the candidate areas existing within the stable scan range are selected as registration areas in the registration area limitation processing 120. When the user selects a registration area by operating the user interface section 62, only the candidate areas in the stable scan range is displayed on the touch panel display, etc., of the user interface section 62, for example, in the registration area limitation processing 120.

In the feature information registration processing 122, information representing the feature of a paper fingerprint (feature information) is extracted from the image in the setup registration area and the feature information and information concerning the registration area where the feature information is extracted are registered in the storage section 66 as the registered feature information 70 in association with each other. If the registration area is previously defined as predetermined shape and size such as 32×32 pixels, for example, the registered feature information 70 contains position information indicating the position in the original as information concerning the registration area. For example, to select a registration area from the candidate areas, identification information such as numbers to distinguish the candidate areas from each other (candidate area ID) is defined and the candidate area ID may be used as the position information of the registration area.

A paper fingerprint generally is used as information indicating whether or not the original is original text. If originals need to be distinguished from each other, original identification information for identifying the original is printed, etc., on the original. As the original identification information, for example, a bar code, a two-dimensional code, OCR (Optical Character Recognition)-possible identification number, an image displayed on the original, or feature information extracted from the image is used. If the original identification information is defined for the original, the information may be contained in the registered feature information 70 of each original.

In the feature information collation processing 124, whether or not the original to be collated (objective original) is an original whose registered feature information 70 is registered (registered original) is checked. In the feature information collation processing 124, an area (collation area) for collating with the paper fingerprint registered in the objective original is set in response to registration area of the registered feature information 70 and the feature information of the paper fingerprint about the objective original is extracted from the collation image of the image in the collation area. The feature information is collated with the feature information about the registered document contained in the registered feature information.

The collation area is set at a corresponding position based on the position information of the registered area contained in the registered feature information. When the collation area is made the same size as the registration area, if the read position slightly shifts, collation is made impossible. Thus, the collation area is set wider than the registration area and if a position shift of the original occurs, it is made possible to include the registration area, and a search is made for a portion matching the paper fingerprint of the registration area in the paper fingerprint of the collation area. For example, in the feature information collation processing 124, if a portion where the correlation value of the pixel value with the image in the registration area become equal to or more than a predetermined threshold value exists in the image in the collation area, it is determined that the paper fingerprint of the objective original matches the paper fingerprint of the registered original.

The characteristic of the scan speed at the paper fingerprint collation time is not necessarily the same as that at the registration time. Specifically, the image processing apparatus 50 for collating is a different model from that at the registration time or if the same image processing apparatus 50 is used, there is a possibility that the characteristic of the scan speed may vary with time. As described above, pixel deviation between the image at the registration time and the image at the collation time is caused to occur because of the difference in the scan speed between the registration time and the collation time and thus to execute appropriate collation, in addition to extraction of the feature information in the stable scan range at the registration time, the scan speed is also considered in image read at the collation time.

An example of the feature information collation processing 124 considering the scan speed at the collation time is processing wherein if the registration area of the selected registered feature information is in the stable scan range of the image processing apparatus 50 for collating, the paper fingerprint of the collation area corresponding to the registration area and the paper fingerprint of the registration area are collated with each other and if it is not positioned in the stable scan range, the user is prompted to select any other registered feature information. If collation with any registered feature information is performed, whether or not the original being collated is original text is determined based on the result. On the other hand, if registered feature information where the registration area is positioned does not exist in the stable scan range, for example, a message indicating that collation is impossible, etc., is sent to the user through the user interface section 62. In the example, the user selects registered feature information, but the paper fingerprint may also automatically select registered feature information. In this case, one positioned in the stable scan range is found, the collation result may be determined at the stage and the processing may be terminated or the collation results obtained by performing processing about all possible registered feature information may be totally determined and whether or not the original matches original text may be determined.

In a different configuration of the feature information collation processing 124, if a registration area is positioned outside the stable scan range of the image processing apparatus 50 for collating, a distortion correction is made using the change characteristic of the scan speed stored in the storage section 66 as the scan speed information 68.

Figure 5:
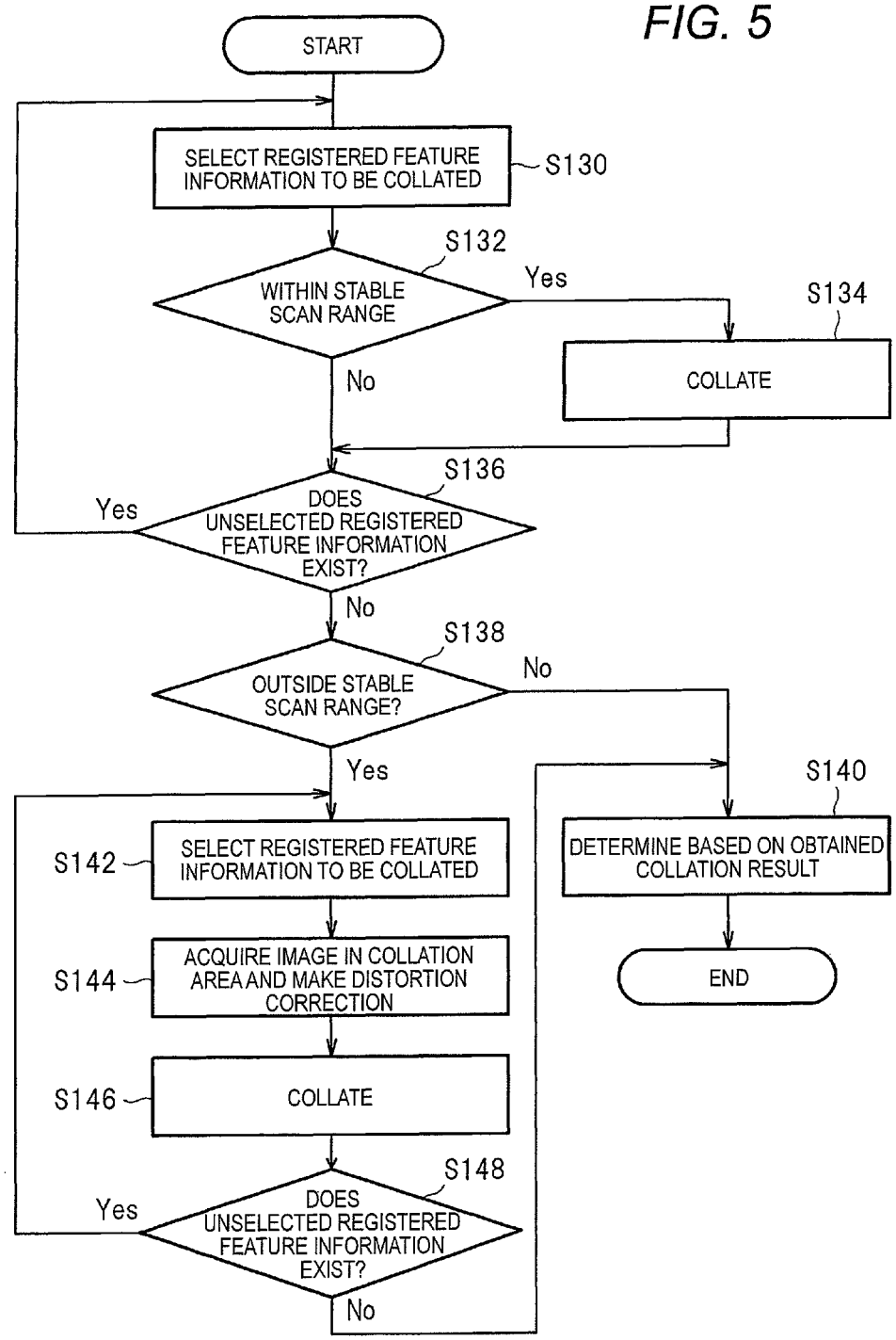
FIG. 5 is a schematic flowchart of feature information collation processing for making a distortion correction.

FIG. 5 is a schematic flowchart of an example of the different configuration. First, an outline of the processing will be discussed. If registered feature information where a registration area is positioned exists in the stable scan range of the image processing apparatus 50, the paper fingerprint processing section 60 of the image processing apparatus 50 collates the paper fingerprint of the collation area corresponding to the registration area with the paper fingerprint of the registration area. If registered feature information where a registration area is positioned does not exist in the stable scan range of the apparatus, an attempt is made to collate with registered feature information where a registration area is positioned outside the stable scan range, namely, a range in which the scan speed changes. In this case, in the feature information collation processing 124, correction (distortion correction) to distortion of a collation image caused by a change in the scan speed is made and feature information of a paper fingerprint is extracted and is collated with the registered feature information.

The feature information collation processing 124 shown in FIG. 5 will be discussed below in more detail: The paper fingerprint processing section 60 selects information to be collated one piece at a time from among pieces of the registered feature information 70 stored in the storage section 65 (S130). The paper fingerprint processing section 60 determines whether or not the registration area of the selected registered feature information 70 is positioned in the stable scan range of the apparatus obtained from the scan speed information 68 (S132). If the registration area is positioned (YES at S132), the paper fingerprint processing section 60 sets a collation area in the objective document to be collated in response to the registration area and extracts feature information of the paper fingerprint about the objective original from a collation image of an image in the collation area. The paper fingerprint processing section 60 collates the feature information with the feature information about registered original contained in the registered feature information (S134) and stores the obtained collation result in the storage section 66. On the other hand, if the registration area is not positioned in the stable scan range (NO at S132), the paper fingerprint processing section 60 skips S134.

The processing (S130 to S134) is repeated for all pieces of the registered feature information 70 to be collated (S136). If at least one piece of the registered feature information 70 in the stable scan range exists (NO at S138), collation determination about the objective original is made based on one or more results obtained in the collation processing S134 about the registered feature information 70.

If all pieces of the registered feature information 70 selected at S130 are outside the stable scan range (YES at S138), the paper fingerprint processing section 60 again selects information to be collated one piece at a time from among pieces of the registered feature information 70 stored in the storage section 65 (S142). The paper fingerprint processing section 60 sets a collation area in the objective original in response to the registration area of the selected registered feature information 70 and acquires an image of the objective original in the collation area. The paper fingerprint processing section 60 makes a distortion correction to the image in the collation area using the change characteristic of the scan speed of the image processing apparatus 50 stored in the storage section 66 as the scan speed information 68 (S144). Specifically, using the scan speed information 68, coordinates p of each pixel in the collation area in the subscan direction are converted into actual coordinates x on the objective original and a collation image $D_c$ after the distortion correction is generated from an image $D_o$ in the former collation area obtained by scan. In the image $D_c$ generated in the conversion, data $D_c(x)$ in the coordinates x in the image is given a pixel value $D_o(p)$ of the image $D_o$ in the coordinates p.

The paper fingerprint processing section 60 extracts feature information of the paper fingerprint about the objective original from the distortion correction image $D_c$. The paper fingerprint processing section 60 collates the feature information with the feature information about the registered original contained in the registered feature information 70 (S146) and stores the obtained collation result in the storage section 66.

The processing (S142 to S146) is loop processing repeated about all pieces of the registered feature information 70 to be collated (S148). Upon completion of the loop processing, collation determination about the objective original is made based on one or more results obtained in the collation processing S146.

In the collation determination S140, for example, if the paper fingerprint of the registered feature information 70 may be detected in the collation area, whether or not the objective original is a registered original is determined. To embed the document identification information described above in an original, the document identification information is extracted from the objective original and the registered feature information 70 having the document identification information is selected at S130, S142. In this case, whether or not the objective document is original text of the original determined by the document identification information, namely, is real thing may be determined in the collation determination S140.

In the determinations, level setting of the reliability of the collation as to determining that collation holds when a match with the registered feature information 70 is found simply in the paper fingerprint at any one place in the objective original or determining that collation holds when a match is found at a number of places equal to or more than a predetermined threshold value may be selected in response to the purpose of the collation determination.

In the processing example in FIG. 5, the loop processing is repeated for all pieces of the registered feature information 70 to be collated, but when a match is detected at a number of places exceeding a predetermined threshold value, the loop processing may be terminated.

The feature information collation processing 124 described above is realized by a program executed by the paper fingerprint processing section 60 and the program is previously stored in the storage section 66, etc., and is executed by a processor forming the paper fingerprint processing section 60.

The distortion correction described above is made using the change characteristic of the scan speed previously stored in the storage section 66 as the scan speed information 68. In this connection, as another realizing method of the distortion correction, a pattern for detecting the scan speed may be embedded in an original. As the embedded pattern, for example, a ladder pattern is printed in a margin, etc., of the original. The scan speed in the collation area is found from the embedded pattern in an image scanning the objective original and an image in the collation area, subjected to the distortion correction may be generated. A bar code or a two-dimensional code may also be used as the embedded pattern. An art of embedding digital data by applying fine gradation to an image of an essential character or photo of an original (MIG (Micro Gradation)) is developed (Japanese Patent Laid-Open No. 2004-140764) and a gradation pattern of the MIG may also be used for detecting the scan speed.

As described above, the function of the paper fingerprint processing section 60 in the image processing apparatus 50 is realized by executing a program. In the exemplary embodiment, the program is stored in the storage section 66 and the processor reads the program from the storage section for execution as required. In another configuration, the program may be provided through a communication medium of a network, etc. In this case, the communication section 58 acquires the program from the network, etc., provides the program for the processor, and stores the program in the storage section 66. The program may also be stored in a record medium of a CD-ROM (Compact Disk Read-Only Memory), etc., for distribution.

In the exemplary embodiment, the paper fingerprint processing section 60 limits the range in which a registration area of a paper fingerprint may be set to the inside of the stable scan range by the registration area limitation processing 120. In the configuration, for example, if a paper fingerprint may not be registered in the stable scan range as one or more candidate areas preset for a registration area are not positioned in the stable scan range, the paper fingerprint processing section 60 notifies the user of the fact through the user interface section 62 and determines that a paper fingerprint is not registered.

On the other hand, in this case, the paper fingerprint processing section 60 may also make the distortion correction described in the feature information collation processing 124 in the feature information registration processing 122. In this configuration, for example, in the feature information registration processing 122, an image of a registered document in a preset registration area or a registration area selected from among the candidate areas. A distortion correction using the change characteristic of the scan speed of the image processing apparatus 50 stored in the storage section 66 as the scan speed information 68 is made to the image in the registration area. Specifically, using the scan speed information 68, coordinates p of each pixel in the registration area in the subscan direction are converted into actual coordinates x on the registered original and a registered image $D_{CR}$ after the distortion correction is generated from an image $D_{OR}$ in the former registration area obtained by scan. In the image $D_{CR}$ generated in the conversion, data $D_{CR}(x)$ in the coordinates x in the image is given a pixel value $D_{OR}(p)$ of the image $D_{OR}$ in the coordinates p. The paper fingerprint processing section 60 extracts the feature information of the paper fingerprint about the registered original from the distortion correction image $D_{CR}$, generates registered feature information 70 based on the feature information, and stores the information in the storage section 66.

[Exemplary Embodiment 2]

In the first exemplary embodiment, the registered feature information 70 is stored in the storage section 66 of each image processing apparatus 50 and the paper fingerprint processing section 60 performs registration and collation processing, but the image processing apparatus of the invention is not limited to the configuration. For example, the invention may be carried out in a system wherein a plurality of image processing apparatus 50 are connected to a server through a network, etc., as client apparatus. In the description of an image processing system according to a second exemplary embodiment of the invention, elements identical with those described in the first exemplary embodiment are denoted by the same reference numerals and will be discussed briefly.

Figure 6:
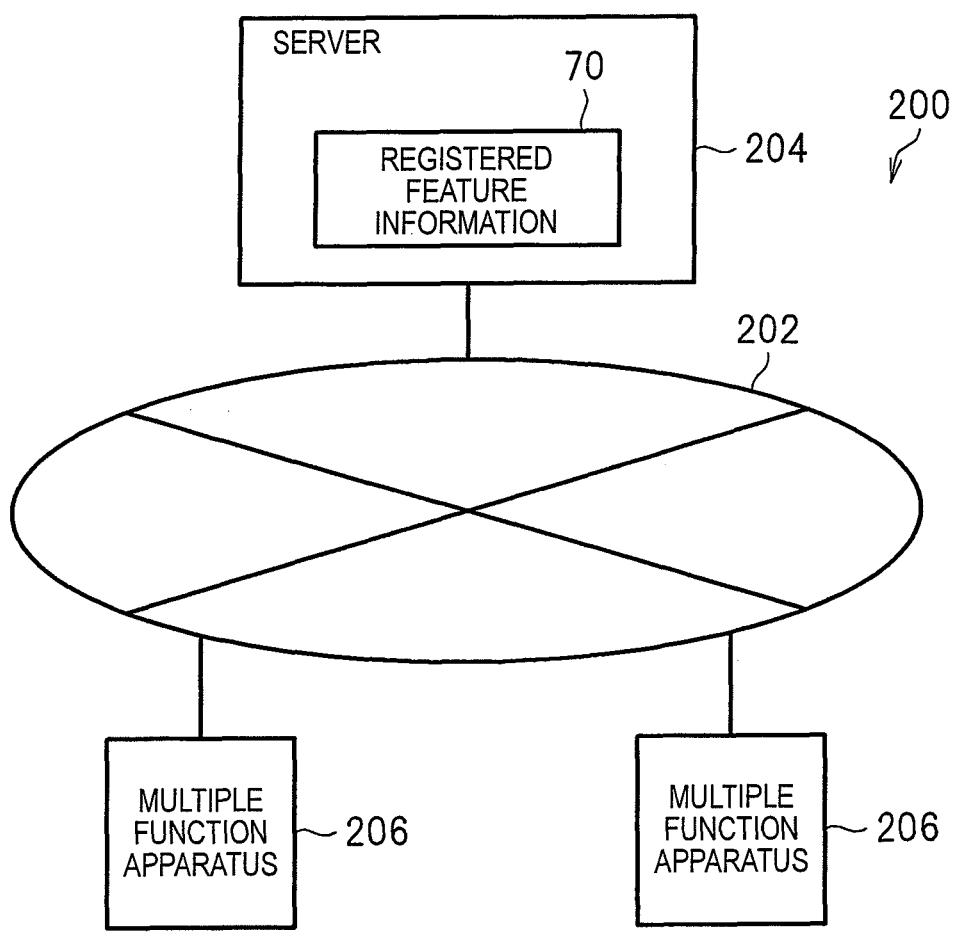
FIG. 6 is a schematic configuration drawing of an image processing system according to a second exemplary embodiment of the invention.

FIG. 6 is a schematic configuration drawing of an image processing system 200 according to the exemplary embodiment of the invention. In the image processing system 200, a server 204 and a plurality of multiple function apparatus 206 are connected through a network 202. The server 204 is a computer installing a DBMS (Database Management System) and holds and manages registered feature information 70 concerning a paper fingerprint.

Each multiple function apparatus basically has a configuration equivalent to that of the image processing apparatus 50 described above. However, registered feature information 70 generated by scanning a registered original in the apparatus need not be held in a storage section 66 of the apparatus and is sent to the server 204 through a communication section and a network 202. On the other hand, in collation processing, the multiple function apparatus 206 acquires the registered feature information 70 corresponding to the original identification information of an objective document, for example, from the server 204 and performs collation processing.

The server 204 manages the registered feature information 70 generated in each multiple function apparatus 206 in a unified manner and thus may easily check integrity between registered feature information 70 already registered about one original and registered feature information 70 newly generated about an original having the same original identification information as that document not only in the case where they are generated in the same multiple function apparatus 206, but also in the case where they are generated in different multiple function apparatus 206. If paper fingerprint feature information differs although the original identification information is the same, the server 204 may refuse to register new registered feature information 70 or may alert the user or system administrator of the multiple function device 206 attempting to register registered feature information.

Scan speed information 68 of each multiple function apparatus 206 may be registered in the server 204. In this case, the server 204 may find a stable scan range common to the multiple function apparatus 206 based on the scan speed information 68 of each multiple function apparatus 206, and each multiple function apparatus 206 may set a registration area in the stable scan range. If the stable scan range common to all multiple function apparatus 206 may not be set, the stable scan range common to some multiple function apparatus 206 and the stable scan range common to different some multiple function apparatus 206 are combined, a registration area is set in each of the stable scan ranges, and the paper fingerprint of each registered original is registered, whereby collation in the stable scan range may be realized between any multiple function apparatus 206.

Here, the clients connected to the network 202 are the multiple function apparatus 206, but any other device such as a network scanner installing the registration function or the collation function of a paper fingerprint may be connected to the network 202. For example, the client may be a device to which an image of an original read through an image reader is input through the network 202, the device for performing processing of determining whether or not a paper fingerprint may be registered about a registration area in the image of the input registered original or may be a device for performing processing of collating a paper fingerprint about a collation area in the image of the input objective original.

The image processing apparatus 50 and the multiple function apparatus 206 register and collate a paper fingerprint using the ADF of the original move method. In an optical system scan method ADF or a method of setting an original on manual platen glass 90 and reading the original, fluctuation of the scan speed generally introduces no problem as compared with the original move method, but the invention described above in the exemplary embodiments may be applied to a device or a state in which fluctuation of the scan speed introduces a problem.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image processing apparatus comprising:
    an acceptance unit configured to accept an image of an original from an image reader configured to read the original at a read position;
    an acquisition unit configured to acquire previously stored information from storage, the previously stored information concerning a stable read range in which a read speed in a conveying direction of the original becomes stable;
    a registration unit configured to:
        extract, from the image of the original, feature information concerning a microscopic pattern on a surface of the original;
        determine whether or not a position of the extracted feature information is within the stable read range corresponding to the previously stored information acquired by the acquisition unit; and
        register the position of the extracted feature information, in response to determining that the position of the extracted feature information is within the stable read range, the registered position of the extracted feature information being used to determine whether a document is a registered original.

2. The image processing apparatus according to claim 1, wherein the acquisition unit is further configured to acquire information concerning a change characteristic of the read speed in the conveying direction in the original from the storage in which the information is previously stored, and wherein
    in response to the registration unit determining that the position of the extracted feature information is outside the stable range, the registration unit corrects the extracted feature information based on the change characteristic and registers the corrected extracted feature information.

3. The image processing apparatus according to claim 1, wherein the image reader includes:
    a conveying unit that includes a pre-read conveying member that sandwiches the original and conveys the original toward the read position; and
    a post-read conveying member that sandwiches the original passing through the read position and conveys the original, and wherein
    the stable read range is determined in response to a read range of the image read unit in a state in which the original is sandwiched between both the pre-read conveying member and the post-read conveying member.

4. An image processing apparatus that checks whether or not an objective original is a registered original using feature information registered about the registered original, the image processing apparatus comprising:
    an acceptance unit configured to accept an image of an objective original from an image reader that conveys the objective original;
    a first acquisition unit configured to acquire information concerning a change characteristic of a read speed in a conveying direction in the original in the image reader for reading the image of the objective original from storage in which the information is previously stored;
    a second acquisition unit configured to acquire the feature information registered by registration unit about the registered original; and
    a collation unit configured to;
    set, based on position information associated with the feature information acquired by the second acquisition unit, a collation area responsive to a registration area
    extract the feature information about the objective original from the collation area in the image of the objective original accepted by the acceptance unit;
    collates the feature information with the feature information acquired by the second acquisition unit, wherein
    in response to the read speed changing in the collation area, the collation unit corrects and collates the feature information about the objective original based on the change characteristic corresponding to the information acquired by the first acquisition unit.

5. A non-transitory computer readable medium storing a computer readable program executable by a computer for causing the computer to execute a process for processing an image, the process comprising:
    accepting an image of an original from an image reader configured to read the original at a read position;
    acquiring previously stored information from storage, the previously stored information concerning a stable read range in which a read speed in a conveying direction of the original becomes stable state;
    extracting, from the image of the original, feature information concerning a microscopic pattern on a surface of the original;
    determining whether or not a position of the extracted feature information is within the stable read range corresponding to the previously stored information; and
    registering, in response to determining that the position of the extracted feature information is within the stable read range, the position of the extracted feature information,
    wherein the registered position of the extracted feature information is used to determine whether a document is registered original.

6. An image processing system comprising:
    an image reader including a conveying unit configured to convey an original in sequence along a conveying path passing through a read position and an image read unit configured to read an image of the original at the read position at read speed responsive to conveying speed of the original by the conveying unit;
    an acceptance unit configured to accept the image of the original from the image reader;
    an acquisition unit configured to acquire previously stored information from storage, the previously stored information concerning a stable read range in which the read speed in the conveying direction in the original becomes a stable state;

a registration unit configured to;

extracts, from the image of the original, feature information concerning a microscopic pattern on a surface of the original;

determine whether or not a position of the extracted feature information is within the stable read range corresponding to the previously stored information acquired by the acquisition unit; and register the position of the extracted feature information, in response to determining that the position of the extracted feature information is within the stable read range, the registered position of the extracted feature information being used to determine whether a document is registered original.

* * * * *